United States Patent Office 3,184,426
Patented May 18, 1965

3,184,426
POLYURETHANE ELASTIC FIBERS AND A
METHOD OF PRODUCING THE SAME
Wilhelm Thoma, Leichlingen, and Heinrich Rinke,
Leverkusen, Germany, assignors to Farbenfabriken
Bayer Aktiengesellschaft, Leverkusen, Germany, a corporation of Germany
No Drawing. Filed Apr. 15, 1960, Ser. No. 22,392
Claims priority, application Germany, Apr. 17, 1959,
F 28,238
12 Claims. (Cl. 260—30.8)

This invention relates to elastic fibers and to a method of producing the same. More particularly it relates to elastic fibers produced by the isocyanate-polyaddition process.

It has been known heretofore to produce elastic plastics by the isocyanate-polyaddition process. The plastics have been produced by reacting polyhydroxy compounds with polyisocyanates and if necessary cross-linking agents. The reaction products are then either cast in molds and hardened at elevated temperatures or modified and then hardened by methods generally found in the rubber industry such as, on mixing rollers.

It is also known to dissolve the elastomers in suitable solvents such as dimethyl formamide at elevated temperatures. The dissolution of the elastomer in dimethyl formamide can be promoted by the introduction of small quantities of organic bases for the reason that the dissolution in the solvent is related to the degradation of the cross-linked elastomers. Therefore, the solution contains strongly degraded products which are difficult to form into filaments in a unitary and reproducible manner from the solution since the degree of degradation can neither be determined nor controlled.

Another method of forming filaments known in the art is to initially prepare an adduct from a polyhydroxy compound and polyisocyanates, which adduct contains free —NCO groups and to spin these reaction products into a precipitating bath containing a cross-linking agent such as a polyamine. The cross-linking of the adduct is thus obtained in the precipitation bath where the cross-linking agent contacts the filament. The cross-linking progresses inwardly and produces the highly elastic state, the surface of the filament first being cross-linked and the core becoming cross-linked in another step such as an after treatment, by use of heat or water.

The prior art methods of making fibers from polyurethane plastics are all deficient not only in the physical properties of the fibers, but also in that no method has been heretofore known in which the fibers could be spun directly from a completely reacted solution.

It is, therefore, an object of this invention to produce highly elastic fibers. It is another object of this invention to provide a method of producing highly elastic polyurethane fibers. It is still another object of this invention to provide a method of making polyurethane fibers by spinning from a solution which requires no further reaction. It is a further object of this invention to provide a solution which may be spun into fibers, which solution may be stored indefinitely.

The foregoing objects and others which will become apparent from the following description are accomplished in accordance with the invention, generally speaking, by providing polyurethane elastic fibers obtained by heating in an inert organic solvent an isocyanate modified organic compound prepared by reacting an organic compound containing active hydrogen containing groups and an excess of a polyisocyanate, with a quantity of polyhydric alcohols or amines less than that required to react with all of the —NCO groups present, and in the presence of a catalyst which causes the polymerization of the isocyanate groups until free isocyanate groups can no longer be detected and spinning the solution through nozzles to form fibers. More particularly, the invention contemplates the production of highly elastic fibers by the isocyanate-polyaddition process whereby the reaction product containing free isocyanate groups and prepared from an organic compound containing active hydrogen containing groups as evidenced by the Zerewitinoff test and having a molecular weight of from about 500 to about 3,000 and an excess of an organic polyisocyanate is heated in an inert solvent with a deficiency of a polyhydric alcohol or amine and in the presence of a catalyst which polymerizes the isocyanate groups and then spinning the solution through a spinnerette or a multi-aperture nozzle into a precipitating bath to form highly elastic fibers.

The isocyanate modified organic compound may be prepared from any suitable organic compound containing active hydrogen containing groups and having a molecular weight between about 500 and about 3,000 and an organic isocyanate. Any suitable compound such as, for example, hydroxyl polyesters, polyhydric polyalkylene ethers and polyhydric polythioethers, and polyacetals may be used in reaction with an organic polyisocyanate to form one of the initial components utilized in the practice of this invention. Of course, the hydroxyl polyester may contain urethane groups, urea groups, amide groups, chalcogen linkages such as oxygen or sulfur and the like. Thus, the term hydroxyl polyester includes not only pure polyesters but also polyester amides, polyester urethanes, polyether esters and the like.

Any suitable hydroxyl polyester may be used such as, for example, the reaction product of a polycarboxylic acid and a polyhydric alcohol. Any suitable polycarboxylic acid may be used in the preparation of a polyester such as, for example, adipic acid, succinic acid, suberic acid, sebacic acid, oxalic acid, methyladipic acid, glutaric acid, pimelic acid, azelaic acid, phthalic acid, terephthalic acid, isophthalic acid, 1,2,4-benzene tricarboxylic acid, thiodiglycolic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, hexane diol, bis-(hydroxymethyl-cyclohexane), trimethylol propane, pentaerythritol and the like. The hydroxyl polyester should have a molecular weight of from about 500 to about 3,000, an hydroxyl number of about 30 to about 300 and an acid number of less than about 5. Any suitable polyester amide may be used such as, for example, the reaction product of an amine or an amino alcohol with a polycarboxylic acid. Any suitable amine such as, for example, ethylene diamine, propylene diamine and the like may be used. Any suitable amino alcohol such as, for example, beta-hydroxyl ethyl amine and the like may be used. Any of the polycarboxylic acids set forth above with relation to the preparation of hydroxyl polyesters may be used in the preparation of polyester amides. The polyester amides may also be prepared by the reaction of diol-diamides such as, for example, the reaction product of adipic acid and diethanolamide, terephthalic acid-bis-propanolamide with a dicarboxylic acid. The polyester amides should have a molecular weight, hydroxyl number and acid number comparable to polyesters.

The polyesters and the polyester amides may be reacted with isocyanates to prepare hydroxyl or amine terminated compounds containing urethane and urea linkages which are suitable for use in the preparation of the spinning solution of this invention. Any suitable isocyanate which will be set forth hereinafter may be used.

Any suitable polyether ester may be used as the organic compound containing active hydrogen containing groups such as, for example, the reaction product of an ether glycol and a dicarboxylic acid such as those previously mentioned with relation to the preparation of polyesters. Any suitable ether glycol may be used such as, for example, diethylene glycol, triethylene glycol, 1,4-phenylene bis-hydroxy ethyl ether, 2,2'-diphenyl propane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4-(beta-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

In the preparation of the organic compound containing active hydrogen containing groups, as determined by the Zerewitinoff method, the compounds preferably should have an hydroxyl number no greater than about 300 and preferably between about 40 and about 200 and a molecular weight between about 500 and about 3,000. The organic compound containing active hydrogen containing groups is admixed with an excess of an organic polyisocyanate to prepare a compound containing terminal —NCO groups. The organic isocyanate is added in an amount in excess of that required to react with all of the hydroxyl groups on the active hydrogen containing compound. The organic compound is preferably in a quantity such as that from about 140 to 340 parts of —NCO groups are provided by the polyisocyanate for each 34 parts of hydroxyl groups in the polyhydroxy compound. The reaction is preferably carried out at a temperature of from about 80° C. to about 150° C. and more advantageous from about 100° C. to 130° C.

It is possible to at first react the organic compound containing active hydrogen containing groups with a deficient amount of polyisocyanate and then with a further amount of polyisocyanate to have an over-all excess.

Any suitable organic polyisocyanate may be utilized in the process of this invention such as, for example, aliphatic polyisocyanates, aromatic polyisocyanates, alicyclic polyisocyanates and heterocyclic polyisocyanates including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene 1,2-diisocyanate, 2,4-toluylene diisocyanate, 2,6-toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl 4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexmethylene diisocyanate, 1-chlorobenzene-2,4-diisocyanate. It is preferred to employ diisocyanates which have more than one aromatic nuclei; maybe these nuclei are condensed or not. It is possible to concurrently use higher functional isocyanates such as 4,4',4''-triisocyanato triphenyl methane, 1,3,5-triisocyanato benzene, 2,4,6-triisocyanato toluene, 4,4'-dimethyl diphenyl methane-2,2',5,5'-tetraisocyanate and the like.

These isocyanate modified compounds having free —NCO groups are next reacted in an inert solvent with a deficiency of a polyhydric alcohol and/or polyamine. The free —NCO groups which remain, enter into a plurality of reactions including the formation of allophanate and biuret linkages by reaction with urethane and urea groups respectively. However, the excess isocyanate groups predominantly form isocyanurate rings because of the presence of a catalyst which causes the polymerization of the isocyanate groups. The catalyst employed is present in a catalytic amount and preferably from about 0.01 to about 5 parts by weight based on the weight of the reaction mixture. This reaction in the inert solvent is carried out until the presence of free —NCO groups can no longer be detected. Thus a completely storage stable cross-linked reaction product is present in the inert solvent which may be utilized at any desired time.

Any suitable polyhydric alcohol may be used in the reaction with the isocyanate-modified compound to prepare the spinning solution in accordance with this invention such as, for example, 1,3-butanediol, 1,4-butanediol, decanediol, hexanediol, thiodiglycol, 1,4-phenylene-bis-hydroxy ethyl ether, ethylene glycol, propylene glycol, bis (hydroxy-methyl-cyclohexane), trimethanol propane, pentaerythritol and short-chain polyesters having terminal hydroxyl groups prepared by reacting polyhydric alcohols with polycarboxylic acids. The polyhydric alcohols and polycarboxylic acids mentioned above for the preparation of the polyester are suitable for the preparation of short-chain polyesters. Any suitable polyamine may be used such as, for example, ethylene diamine, propylene diamine, hexamethylene diamine, cyclohexylene diamine, phenylene diamine, toluylene diamine, 3,3'-dichlorobenzidine, 3,3'-dinitrobenzidine, hydrazine, triaminobenzene and the like. The polyhydric alcohols and polyamines shall have a molecular weight of not more than 400.

Any suitable solvent which is inert to both the hydroxyl compounds and the organic isocyanate may be used as a solvent in which the reaction between the components is carried out such as, for example, methylethylketone, diethylketone, methylpropylketone, dipropylketone, methylisobutylketone, butylacetate, dipropylether, dioxane, tetrahydrofuran, chlorobenzene, dichlorobenzene, and mixtures of any two or more of the above-mentioned solvents.

Any suitable catalyst which will cause the polymerization of the terminal —NCO groups may be used such as, for example, tertiary amines, alkali alcoholates, alkali phenolates, fatty acid salts or heavy metal compounds such as, iron acetyl acetonate, phosphines such as triethylphosphine. Specific examples of substances which will catalyze the polymerization reaction of the terminal —NCO groups are such as, for example, dimethyl cyclohexyl amine, N-methyl-N'(dimethyl amino ethyl) piperazine, permethylated diethyl amine propyl amine, permethylated ethoxy propyl amine, permethylated methoxy propyl amine, permethylated diethylene triamine, the reaction product of diethylethanol amine and phenyl isocyanate, triethylene diamine, the alkali salts of phenols such as the sodium and the potassium salts, calcium acetate, sodium acetate, potassium acetate, sodium formate, sodium carbonate, sodium methoxide, potassium ethoxide, potassium benzoate, tin-II-octoate and the like.

It is essential in this step of the reaction, that is, the reaction between the isocyanate modified compound and the dihydric alcohol or diamine in the presence of a polymerization catalyst, that the solvent be inert with respect to the components. As stated previously, it has been already proposed to carry out isocyanate-polyaddition reactions in dimethyl formamide. Dimethyl formamide is, however, useless in this step of the process for the reason that it enters into the reaction with the —NCO groups by splitting off carbon dioxide and resulting in a loss of —NCO groups. The following table illustrates the decrease of —NCO groups in the presence of dimethyl formamide at 100° C. The initial concentration was established by introducing 5.0 grams of 4,4′-diphenyl methane diisocyanate in 200 ml. of dimethyl formamide.

| Time (hours): | Isocyanate concentration in percent of initial value |
| --- | --- |
| 0 | 100 |
| 0.5 | 50 |
| 1 | 35 |
| 2 | 10 |
| 3 | 0 |

One preferred method of carrying out the procedure of this invention to prepare the solution which is subsequently to be spun into fibers is to dissolve the reaction product containing free —NCO groups in an inert solvent and to add to this solution a second solution containing the polyhydric alcohol and/or amines. This second solution preferably also contains the polymerization catalyst. This solution is heated to from about 70° C. to about 130° C. and preferably from about 80° C. to about 100° C. to effect the completion of the reaction which is evidenced by the disappearance of free —NCO groups.

It may be desirable in some instances to terminate the polymerization reaction or cross-linking reaction by adding monohydric alcohols and/or monoamines to the reaction mixture. By this addition some of the free —NCO groups will be permanently combined through urethane or urea groups to the hydroxyl or amine bearing substituent, thus acting as a chain terminating reagent. Any suitable monohydric alcohol or monoamine may be used such as, for example, ethanol, propanol, butanol, phenol, cyclohexanol and the like; ethyl amine, propyl amine, butyl amine, diisobutylamine, aniline, N-methylaniline, cyclohexyl amine and the like. In the event too large a quantity of the monovalent component is introduced, it may be eliminated by the addition of a suitable acid or by adding low pyrocarbonic acid esters, such as the pyrocarbonic acid ethyl ester.

After the reaction in which all the isocyanate groups are eliminated by the polymerization thereof, the resulting highly viscous solutions may be diluted with suitable solvents which are not necessarily inert with respect to the —NCO groups, since free —NCO groups are no longer present. Although it is not necessary, it is advantageous to adjust the solid content of the solution between about 20 to about 50 percent. Solvents particularly suitable for this purpose are dimethyl formamide, dimethyl acetamide, and dimethyl sulphoxide. Of course, it is also possible to use non-volatile solvents having the characteristics of plasticizers. When such solvents are used, the solid content of the solution can be far above 50 percent. These substances which act as plasticizers must be soluble in water. Any suitable solvent which is water soluble may be used such as, for example, polyethylene oxides which are etherified or esterified on the terminal groups may be used.

Pigments and fillers such as, for example, titanium dioxide or talcum can be incorporated into the solutions at this point in the procedure. Further, if desired, spirit soluble or fat soluble dyestuffs may be added to the solution to obtain any desired predetermined colored fiber. These solutions which may be either viscous or diluted solutions are then spun through nozzles to form fibers. The viscous solution can be shaped into filaments for example, by conveying the solution by means of a controlled-feed pump to a multi-aperture nozzle or spinnerette where it is forced out into a precipitating bath. This bath can be water or an aqueous methanol solution in which the solvent can be concentrated up to 20 percent. To accelerate the precipitation after the spinning solution leaves the nozzle, the temperature of the precipitating bath can be raised to from about 20° C. to about 100° C. and more particularly from about 40° C. to about 60° C. This expedites the removal of the solvent in which the polyaddition product has been dissolved. The filaments are then guided over heated rollers for the purpose of drying and wound on spools or bobbins in the manner known in the fiber manufacturing art. The fiber formed by the nozzle is withdrawn therefrom at a speed of between about 5 and about 30 meters per minute. A procedure analogous to that outlined above is suitable when highly viscous plasticized pastes heretofore referred to are spun from nozzles under increased pressure.

The spinning process may also be carried out without the use of a precipitating bath by spinning the solution into fibers from a multi-apertured nozzle or spinnerette which simultaneously produces from 8 to 20 filaments into a vertical shaft having a length of from about 2 to about 5 meters. This shaft is provided with hot gases or vapors such as, for example, air, nitrogen, carbon dioxide or steam which are injected into the shaft from the bottom. The temperature within the shaft is maintained to from about 100° C. to about 250° C. and preferably from about 130° C. to about 180° C. while the air temperature is maintained at a lower temperature of from about 80° C. to about 230° C. and preferably between from about 100° C. to about 160° C. The filaments after leaving the shaft are guided over a driven roller which dips the fibers into a water bath maintained at a temperature of from about 20° C. to about 100° C. and preferably from about 30° C. to about 70° C. in order to remove the last traces of the solvent. The fibers are next dried by means of hot air, infra-red radiation and the like and then wound on spools in the customary manner. When using this process, which will be referred to as the dry-spinning process, the withdrawal speed is maintained from about 50 to about 250 meters per minute and preferably from about 75 to 150 meters per minute.

It was not to be expected that polyaddition products with such degrees of branching and cross-linking could be produced by the isocyanate polyaddition process in solution into products having the desired mechanical properties even after shaping into filaments, such as, for example, high breaking strength and high elongation. On the contrary it was to be expected that in the attempt to produce the molecular structure necessary for this purpose, such an extensive cross-linking would occur that a further processing would become impossible. As compared with other known isocyanate polyaddition processes for the production of fibers, the present process is characterized by the fact that the spinning solution no longer contains any free isocyanate and can therefore be stored. Whereas components containing free —NCO groups are spun into polyamines according to one of the known processes initially referred to, so that it is only during the actual spinning operation that the cross-linking of the spun material takes place, the procedure according to this invention is that the solution of an already branched and cross-linked plastic is spun into a precipitating agent, such as into water, an aqueous-organic or an organic media. This enables the spinning solutions obtainable according to the invention to be spun by the dry spinning process into heated shafts, the rapid evaporation of the solvent being assisted by blowing in hot gases. The high proportion of the relatively low-boiling inert solvent has proved to be of particular advantage in this case. The dry spinning process permits easy recovery of the solvents.

The filaments prepared by the wet-spun or dry-spun method are highly elastic, opaque and have a circular cross-section. The breaking elongation of the threads produced by the method of this invention is between from about 300 to about 800 percent, depending upon the withdrawal speed. The count of the individual filaments is about 5 to 50 denier. The breaking strength is between from about 0.30 and about 1.50 grams per denier. This figure is calculated on the initial count. The force for stretching the fibers by 50 percent is about 0.03 to 0.06 gram per denier and that for stretching by 200 percent is about 0.08 to 0.30 gram per denier. The highly elastic fibers produced by the process of this invention are resistant to boiling in aqueous alkaline solutions, such as soda and in washing liquors consisting of commercial detergents. They are also resistant to solvents, for example, benzine and trichloroethylene.

These fibers which have unusual elastic properties are particularly suitable for use in the manufacture of elastic straps, bandages, girdles, corsets and other articles. The low count of the individual filaments also makes possible the use of these filaments in the manufacture of elastic stockings. Further, the fibers prepared by this method may be processed in combination with synthetics or other natural textile fibers to prepare fabrics and materials having properties which have not been heretofore known.

The invention will be further illustrated by the following examples, the parts being by weight unless otherwise specified.

Example 1

About 100 g. of a polyester having an hydroxyl number of about 56 and prepared from ethylene glycol and adipic acid are dehydrated in vacuo and then reacted for about 1 hour at about 130° C. with about 40 g. of 4,4'-diphenylmethane diisocyanate. The melt containing NCO groups is dissolved in about 50 g. of dry methylethylketone and a solution of about 9.0 g. of butane-1,4-diol and about 0.4 cc. of dimethylcyclohexylamine in about 50 g. of methylethylketone is added at about 80° C. The reaction solution is kept for about 30 minutes at about 80° C., then about 200 g. of dimethyl formamide heated to about 80° C. are added. Thereafter another 300 g. of dimethyl formamide are added at room temperature.

The 20 percent spinning solution is supplied at a delivery rate of about 0.6 cc./min. and spun from a 10-aperture spinnerette (aperture diameter 0.1 mm.) into water at a temperature of 50° C. The precipitating bath is 2 meters in length and the withdrawal speed 15 m./min. The filament is thereafter dried with hot air and wound.

The filament has an elongation at break of 780 percent, a count of 125 denier, a breaking strength of 0.41 g./denier and a load for 50% elongation of 0.03 g./denier, for 200% elongation of 0.08 g./denier.

Example 2

The 20 percent spinning solution prepared according to Example 1 is spun at a delivery rate of about 0.6 cc./min. from a 10-aperture nozzle and at about 50° C. into a precipitating bath consisting of about 1.65 parts of methylethylketone, about 8.35 parts of dimethyl formamide and about 90 parts of water. The precipitation bath and withdrawal speed are similar to those given in Example 1.

After being dried and conditioned with air having a humidity of about 65 percent and a temperature of about 25° C., the filament has the following mechanical values:

Count _____ deniers__ 93.6
Elongation _____ percent__ 680
Breaking strength _____ g./denier__ 0.25

Example 3

About 100 g. of the polyester described in Example 1 are heated with about 40 g. of 4,4'-diphenylmethane-diisocyanate at about 130° C. for about 1 hour. There is added thereto a suspension of about 11.9 g. of titanium dioxide in about 50 g. of methylethylketone, and also a solution of about 9.0 g. of butane-1,4-diol and about 0.4 cc. of dimethylcyclohexylamine in about 50 g. of methylethylketone and the reaction mixture is kept for about 20 minutes at about 80° C. About 125 g. of dimethylformamide are then added and the solution is concentrated in vacuo at slightly elevated temperature from about 40 percent to about 45 percent of polycondensate content.

The solution is spun into an aqueous precipitating bath at about 50° C. and further processed as set out in Example 1.

Example 4

About 200 g. of the polyester described in Example 1 are reacted with about 80 g. of 4,4'-diphenylmethane diisocyanate for about 1 hour at about 130° C. The melt is taken up in about 100 g. of methylethylketone. A solution of about 18.0 g. of butane-1,4-diol and about 0.8 cc. of dimethyl cyclohexylamine in about 75 g. of methylethylketone is added and allowed to react for about 20 minutes at about 80° C. The solution is then diluted with about 175 g. of dimethyl formamide. The 46.3 percent highly viscous spinning solution is spun at a delivery rate of about 3.6 cc./min. through an 8-aperture nozzle (aperture diameter 0.20 mm.) from above into a heated shaft having a length of 4.5 m., a diameter of 200 mm. and heated to about 150° C. Air heated to about 110° C. is introduced from below into the vertically disposed shaft at a rate of about 10 to about 12 cubic meters per minute. The filament is guided at the bottom end of the shaft over a guide roller, into a water bath maintained at a temperature of about 55° C. where it is freed from the residual quantity of solvent and is then dried by hot air and infra-red light. The filament has the following mechanical values:

Count _____ deniers__ 214
Elongation _____ percent__ 800
Breaking strength _____ g./denier__ 0.43

Example 5

About 100 g. of a poly-1,4-butylene glycol ether having an hydroxyl number of about 43 are dehydrated in vacuo and then reacted with about 30.8 g. of 4,4'-diphenylmethane diisocyanate at about 130° C. This melt is dissolved in about 100 g. of methylethylketone and there is added thereto a solution of about 6.70 g. of butane-1,4-diol and about 0.20 g. of trimethylol propane and also about 0.4 cc. of dimethyl cyclohexylamine in about 50 cc. of methylethylketone. The reaction solution is kept for about 2 hours at about 80° C. About 1.0 cc. of diisobutylamine is added for terminating the reaction and then the reaction solution is diluted with about 260 g. of dimethyl formamide. This spinning solution is spun according to Example 1 into an aqueous precipitating bath. The highly elastic filament which is obtained has the following mechanical values:

Count _____ deniers__ 100
Elongation _____ percent__ 730
Breaking strength _____ g./denier__ 0.24

Example 6

About 100 g. of a polyester described in Example 1 are reacted for about 25 minutes at about 130° C. with about 18.0 g. of 1,5-naphthylene diisocyanate. The melt is dissolved in about 50 g. of methylethylketone and a solution of about 2.0 g. of butanediol and about 0.1 cc. of dimethyl cyclohexylamine in about 35 g. of methylethylketone is added. After about 25 minutes, the reaction which is conducted at about 80° C. is terminated. About 155 g. of dimethyl formamide are added and the solution is spun in a manner analogous to Example 1.

Example 7

(a) About 100 g. of a polythioether having a hydroxyl number of about 110 and obtained by the polycondensation of thiodiglycol is caused to react with about 78 g. of 4,4'-diphenylmethane diisocyanate for about 15 minutes at about 130° C. The melt is dissolved in about 75 g. of methylethylketone and a solution of about 17.6 g. of butane-1,4-diol and about 0.4 cc. of dimethyl cyclohexylamine in about 50 g. of methylethylketone is added. After about 15 minutes at about 80° C., the reaction is completed. The viscous solution is diluted with about 170 g. of dimethyl formamide and this solution is spun in a manner analogous to Example 1 into water as precipitating agent.

(b) About 100 g. of the polythioether described in part (a) are heated with about 12.3 g. of 4,4'-diphenylmethane diisocyanate for about 10 minutes at about 90° C. The polycondensate containing hydroxyl groups is further reacted with about 39.3 g. of the same diisocyanate at about 130° C. The operative period is about 15 minutes. The melt is taken up in about 50 g. of methylethylketone and a solution of about 8.9 g. of butane-1,4-diol in about 50 g. of methylethylketone is added thereto while also adding about 0.4 cc. of dimethylcyclohexylamine. The temperature is kept for about 10 minutes at about 80° C. and the solution is diluted with about 140 g. of dimethyl formamide. Spinning is carried out in a manner analogous to Example 1 into water as precipitating agent.

The fibers obtained according to Example b have a higher elongation than those spun according to (a).

*Example 8*

About 100 g. of the polyester described in Example 1 are reacted with about 40 g. of 4,4'-diphenyl methane diisocyanate at about 130° C. After the melt has been dissolved in about 50 g. of methylethylketone, there is added thereto a solution of about 17.4 g. of 1,10-decanediol in about 50 g. of methylethylketone and it is heated in the presence of about 0.4 cc. of dimethyl cyclohexylamine for about 20 minutes at about 80° C. The viscous solution is thereafter diluted with about 215 g. of dimethyl formamide.

The shaping of the 33 percent solution to form filaments is carried out in a manner analogous to Example 1.

*Example 9*

About 100 g. of the polyester described in Example 1 are reacted with about 40 g. of 4,4'-diphenylmethane diisocyanate at about 130° C. The melt is taken up in about 50 g. of dry n-butylacetate and a solution of about 9.0 g. of butane-1,4-diol and about 0.4 cc. of dimethyl cyclohexylamine in about 50 g. of n-butylacetate is added. The mixture is left to react for about 20 minutes at about 80° C. and then about 50 g. of dimethyl formamide are added. The viscous solution is spun into a heated shaft in a manner analogous to Example 4.

*Example 10*

About 4,000 g. of thoroughly dried polyester having an hydroxyl number of about 56 are stirred in a manner analogous to Example 1 for about 1 hour at about 130° C. with about 1600 g. of 4,4'-diphenylmethane diisocyanate in a vessel provided with a heating means and a stirrer mechanism. The reaction mixture is then dissolved by adding about 200 g. of methylethylketone, the temperature of the solution being lowered to 80° C. The solution is kept at this temperature.

Using a gear wheel pump, about 7.60 grams per minute of this solution are pumped into a small mixing worm heated to about 80° C. while simultaneously supplying by means of another gear wheel pump about 2.38 g. per min. of a solution of about 360 g. of butane-1,4-diol and about 16 g. of dimethyl cyclohexylamine in about 2,000 g. of methylethylketone. By the pressure of the mixing worm, the reaction mixture is forced through a tube with a length of 1 meter and an internal diameter of 1 cm., this tube being heated by means of a double jacket to about 80° C. The reaction mixture thereafter enters a second mixing worm which is heated to about 80° C. and into which, by means of a third gear wheel pump, about 5.0 g. per min. of dimethyl formamide are fed to dilute the reaction solution. After travelling through another tube 2 m. long and 1 cm. internal diameter which is heated to from about 60 to about 80° C., the spinning solution which is now a 40 percent solution with a viscosity of 1900 poises at 20° C., is distributed in a manner analogous to Example 4 to five heated spinning shafts, 3 cc. of spinning solution per minute are spun through 8-aperture nozzles in each shaft. The filament is wound in the same manner as in Example 4.

*Example 11*

500 grams of the polyester of Example 1 are reacted for 1 hour at 130° C. with 200 grams of 4,4'-diphenyl methane diisocyanate. The melt is cooled to 100° C. and dissolved in 250 grams of dry methyl ethyl ketone of room temperature. The temperature of the solution is then about 80° C. A solution of 45 grams of 1,4-butane diol in 190 grams of methyl ethyl ketone is poured in a slightly boiling solution. 2 cm.³ of dimethyl cyclohexylamine are added. The mixture is thereafter heated to 80° C. and kept for about 20 minutes. Then 390 grams of glycolcarbonate heated to 80–85° C. are added. The reaction solution is kept for another 10 minutes.

The hot solution is supplied at a delivery rate of 3.6 cm.³ per minute and spun from an 8-aperture spinnerette, (aperture diameter 0.2 mm.) from above into a heated shaft having a length of 4.5 m., a diameter of 200 mm., and heated to about 160° C. Air heated to about 110° C. is introduced from below into the vertically disposed shaft at a rate of from 10–15 cm.³. The filament is guided at the bottom end of the shaft over a guide roller, into a water bath maintained at 15° C. where it is freed from the residual quantity of solvent and is then dried by hot air.

*Example 12*

(a) 400 grams of the polyester of Example 1 are dehydrated in vacuo and then reacted with 160 grams of 4,4'-diphenyl methane diisocyanate at 130° C. for 1 hour. The melt is dissolved in 200 grams of methyl ethyl ketone at 100° C. A solution of 32.4 grams of 1,4-butane diol, 7.92 grams of 1,4-phenylene bis-oxethyl ether and 1.6 cm.³ of dimethyl cyclohexylamine in 150 grams of methyl ethyl ketone are then added and the mixture is kept at 80° C. while adding 310 grams of dimethyl formamide, heated to 80° C., reaction is completed by adding 2 cm.³ of diisobutyl amine in 20 grams of dimethyl formamide. The spinning solution thus obtained has a viscosity of about 700 poises at 20° C. measured in the Epprecht Viscosimeter. The spinning solution is spun according to Example 4 into a heated shaft.

| | |
|---|---|
| Count _____deniers__ | 62 |
| Breaking strength _____g./denier__ | 0.32 |
| Elongation _____percent__ | 200 |

(b) In analogous manner 10.16 grams of terephthalic acid-bis-oxethyl ester can be used in making the spinning solution instead of 7.92 grams of 1,4-phenylene bis-oxethyl ether. The elastic filaments which are obtained have the following mechanical values:

| | |
|---|---|
| Count _____deniers__ | 60 |
| Breaking strength _____g./denier__ | 0.37 |
| Elongation _____percent__ | 440 |

(c) In analogous manner 17.20 grams of 4,4'-diphenyl methane-(bis-oxbutylurethane) can be used in making the spinning solution instead of 7.92 grams of phenylene bis-oxethyl ether. The elastic filaments obtained after 10 minutes fixation in water have the following mechanical properties:

| | |
|---|---|
| Count _____deniers__ | 55 |
| Breaking strength _____g./denier__ | 0.56 |
| Elongation _____percent__ | 200 |

(d) In analogous manner 10.96 grams of N-(naphthyl)-N'-(1,3-dihydroxyl-2-methyl propyl-2)-urea can be used instead of 7.92 grams of 1,4-phenylene bis-oxethyl ether. The urethane derivate is prepared from 2-naphthylisocyanate and 1,3-dihydroxy-2-methyl-2-amino propane. The elastic filaments thus obtained have the following mechanical properties:

Count _____deniers__ 185
Breaking strength _____g./denier__ 0.27
Elongation _____percent__ 640

Example 13

200 grams of the polyester of Example 1 are dehydrated in vacuo and reacted with 80 grams of 4,4'-diphenyl methane diisocyanate at 130° C. for 1 hour. The melt is dissolved in 100 grams of methylisobutyl ketone and then is added thereto a solution of 18 grams of 1,4-butane diol in 25 grams of diethyl ketone and also another 50 grams of ethyl isobutyl ketone. The mixture is heated for 2 hours to 95–100° C. The viscous mass thus obtained is diluted with 150 grams of hot dimethyl formamide. The reaction is terminated by adding 2 cm.$^3$ of diisobutyl amine and 2 cm.$^3$ of N-methylaniline. The spinning solution has a viscosity of 750 poises at 25° C. The spinning solution is spun according to Example 4 into a heated shaft.

Count _____deniers__ 70
Breaking strength _____g./denier__ 0.3
Elongation _____percent__ 300

Example 14

200 grams of the polyester of Example 1 are dehydrated and heated for 1 hour with 80 grams of 4,4'-diphenyl methane diisocyanate at 130° C. The melt is dissolved in 100 grams of dimethyl ketone and then added thereto a solution of 18 grams of 1,4-butane diol and 0.1 gram of diaza-bicyclooctane in 75 grams of methyl ethyl ketone.

The reaction mixture is kept for 15 minutes at 80° C. The viscous mass is diluted with 155 grams of dimethyl formamide. Reaction is completed after 10–15 minutes by adding 2 grams of diethanol amine in 10 grams of dimethyl formamide. The excess secondary amine is removed by adding 2 cm.$^3$ of pyrocarbonic acid ethyl ester. The viscous spinning solution is spun according to Example 4 into a heated shaft.

Count _____deniers__ 90
Breaking strength _____g./denier__ 0.35
Elongation _____percent__ 670

Example 15

400 grams of the polyester prepared from 1,6-hexane diol and adipic acid (OH number 49, acid number 1.4) are heated for 1 hour with 145.6 grams of 4,4'-diphenyl methane diisocyanate to 130° C. The melt is dissolved in 140 grams of methyl ethyl ketone and a solution of 32.8 grams of 1,4-butane diol and 1.6 grams of dimethyl cyclohexylamine in 100 grams of methyl ethyl ketone is added. After reacting for 10 minutes at 80° C. the viscous mass is diluted with 410 grams of hot dimethyl formamide. Reaction is completed after another 10 minutes by adding 8 grams of diethanol amine and 20 grams of dimethyl formamide. The viscous 46.1% spinning solution thus obtained is spun in a manner analogous to Example 4. Through the shaft talcum is passed to improve the sliding of the filament.

Count _____deniers__ 152
Breaking strength _____g./denier__ 0.35
Elongation _____percent__ 530

After 2 hours' boiling in sodium carbonate (50 grams Na$_2$CO$_3$/litre) the filament has the following properties:

Count _____deniers__ 140
Breaking strength _____g./denier__ 0.25
Elongation _____percent__ 600

Example 16

400 grams of a polyester prepared from 50 mol percent ethylene glycol, 50 mol percent 1,4-butylene glycol and adipic acid (OH number 57, acid number 1) are reacted for 1 hour with 160 grams of diphenyl methane diisocyanate at 130° C. The melt is dissolved in 200 grams of methyl ethyl ketone and a solution of 36 grams of 1,4-butane diol and 1.6 cm.$^3$ of dimethyl cyclohexyl amine in 150 grams of methyl ethyl ketone is added. The reaction mixture is kept for 20 minutes at 80° C. and then diluted with 310 grams of hot dimethyl formamide. After 30 minutes reaction is completed by adding 3 grams of diethanol amine in 40 grams of dimethyl formamide. The viscous 4.6% spinning solution is spun into a heated shaft according to Example 4.

Count _____deniers__ 110
Breaking strength _____g./denier__ 0.25
Elongation _____percent__ 400

Example 17

200 grams of the polyester of Example 1 are heated for 1 hour with 80 grams of 4,4-diphenyl methane diisocyanate to 130° C. The melt is dissolved in 65 grams of methyl ethyl ketone. A solution of 16.1 grams of 1,4-butane diol in 65 grams of methyl ethyl ketone is added, the reaction mixture kept for 1 hour at 80° C. and the viscous mass then diluted with 150 grams of hot dimethyl formamide. The solution is quickly cooled to 30–35° C. A solution of 3.96 grams of 4,4'-diaminodiphenyl methane in 50 grams of dimethyl formamide is dropped into the reaction mixture. Reaction is completed after 10 minutes by adding 3 grams of diethanol amine in 30 grams of dimethyl formamide. The viscous 4.6% spinning solution is spun into a heated shaft according to Example 4.

Count _____deniers__ 144
Breaking strength _____g./denier__ 0.3
Elongation _____percent__ 860

Example 18

200 grams of the polyester of Example 1 are reacted with 87.5 grams of 4,4'-diphenyl methane diisocyanate for 1 hour at 130° C. The melt is dissolved in 100 grams of methyl ethyl ketone. A solution of 18 grams of 1,4-butane diol, 0.5 cm.$^3$ of dimethyl cyclohexyl amine and 0.54 gram of water in 75 grams of methyl ethyl ketone are added. The mixture is reacted for 10 minutes at 80° C. The viscous mass thus obtained is diluted with 155 grams of hot dimethyl formamide. Reaction is completed by adding 2 grams diethanol amine in 20 grams of dimethyl formamide. The 46.1% spinning solution is spun into a heated shaft in accordance with Example 4.

Count _____deniers__ 148
Breaking strength _____g./denier__ 0.3
Elongation _____percent__ 680

Example 19

200 grams of a polyacetal prepared from formaldehyde and bis-oxethyl-1,4-butylene ether (OH number 53.2) are reacted with 76.4 grams of 4,4'-diphenyl methane diisocyanate for 45 minutes at 130° C. The melt is dissolved in 100 grams of 1,4-butane diol and 70 grams of methyl ethyl ketone is added and the mixture kept for 90 minutes at 80° C.

The viscous mass is diluted with 160 grams of dimethyl formamide and the reaction completed by adding 2 grams of diethanol amine in 10 grams of dimethyl formamide. The 46% spinning solution is spun into a heated shaft. The highly elastic filaments thus obtained show an excellent resistance against boiling liquids and washing liquors.

Example 20

200 grams of a polyacetal prepared from 1,6-hexane diol and formaldehyde (OH number 39) are dehydrated in vacuo and heated for 30 minutes with 55.8 grams of 4,4'-diphenyl methane diisocyanate to 35° C. The melt is dissolved in 100 grams of methyl ethyl ketone. A solution of 12.5 grams of 1,4-butane diol in 50 grams of methyl ethyl ketone is then added. The reaction mixture is kept for 30 minutes at 80° C. and then diluted with 200 grams of dimethyl formamide. Reaction is completed after another 20 minutes by adding 5 grams of diethanol amine in 50 grams of dimethyl formamide. The 40% spinning solution has a viscosity of 600 poises at 25° C.

(a) The spinning solution is supplied at a delivery rate of 2.4 cm.³ per minute and spun from an 8-aperture spinnerette (aperture diameter 0.2 mm.) from above into a heated shaft having a length of of 4.5 m., a diameter of 200 mm., and heated to 150° C.

Air heated to 110° C. is introduced from below together with talcum at a rate of 10–12 cm.³ per hour. The filament is guided at the bottom end of the shaft over a guide roller and wound.

Count _____deniers__ 100
Breaking strength _____g./denier__ 0.3
Elongation _____percent__ 450

(b) The spinning solution is supplied at a delivery rate of 2.4 cm.³ per minute and spun from an 8-aperture spinnerette into water at a temperature of 50° C. The precipitating bath is 2 m. in length and the withdrawal speed 20 m. per minute. The filament is stored in water for 2 hours. After drying it exhibits the following properties:

Count _____deniers__ 600
Breaking strength _____g./denier__ 0.25
Elongation _____percent__ 620

*Example 21*

200 grams of a polyacetal prepared from 1,6-hexane diol and formaldehyde (OH number 98), are heated with 15.3 grams of toluylene diisocyanate for 30 minutes to 100° C. 70.5 grams of 4,4′-diphenyl methane diisocyanate are added. The melt is heated another 45 minutes to 100° C. and then dissolved in 130 grams of methyl ethyl ketone. A solution of 15.8 grams of 1,4-butane diol and 0.2 cm.³ of dimethyl cyclohexyl amine in 20 grams methyl ethyl ketone is added and the reaction mixture kept for 30 minutes at 80° C. The viscous mass thus obtained is diluted with 260 grams of dimethyl formamide. After 30 minutes reaction is completed by adding a solution of 2 grams of diethanol amine in 40 grams of dimethyl formamide. The viscous 40%-spinning solution is spun according to Example 4.

Count _____deniers__ 110
Breaking strength _____g./denier__ 0.45
Elongation _____percent__ 560

It is of course to be understood that this invention is not limited by these examples but that any of the components set forth above may be utilized in place of those used in the examples. For example, any of the organic compounds containing active hydrogen containing groups may be used in the examples. Further, any of the organic solvents and polyisocyanates may be substituted into the procedures set forth.

Although the invention has been described in considerable detail for the purpose of illustration, it is to be understood that variations may be made therein by those skilled in the art without departing from the spirit of the invention and the scope of the claims.

What is claimed is:

1. A process for preparing a spinning solution for the preparation of elastic polyurethane fibers which comprises heating in an inert solvent, said inert solvent being non-reactive with —NCO groups, (1) an isocyanate modified organic compound prepared by reacting (a) an organic compound containing active hydrogen containing groups as determined by the Zerewitinoff method and having a molecular weight of from about 500 to about 3000 with (b) an excess of an organic polyisocyanate sufficient to provide free NCO groups in said isocyanate modified organic compound, with (2) a member selected from the group consisting of polyhydric alcohols and polyamines, the quantity of which is insufficient to react with all of the isocyanate groups of said isocyanate modified organic compound and (3) an isocyanate polymerization catalyst, continuing the reaction until the solution is free of —NCO groups while adding to the viscous solution a solvent selected from the group consisting of dimethyl formamide, dimethyl acetamide and dimethyl sulfoxide.

2. An elastic polyurethane fiber prepared by the process of claim 1.

3. A completely reacted spinning solution for preparing polyurethane fibers prepared by the process which comprises heating in an inert solvent, said inert solvent being non-reactive with —NCO groups, (1) an isocyanate modified organic compound prepared by reacting (a) an organic compound containing active hydrogen containing groups as determined by the Zerewitinoff method and having a molecular weight of from about 500 to about 3000 with (b) an excess of an organic polyisocyanate sufficient to provide free NCO groups in said isocyanate modified organic compound, with (2) a member selected from the group consisting of polyhydric alcohols and polyamines, the quantity of which is insufficient to react with all of the isocyanate groups of said isocyanate modified organic compound and (3) an isocyanate polymerization catalyst and continuing the reaction until the solution is free of —NCO groups while adding to the viscous solution a solvent selected from the group consisting of dimethyl formamide, dimethyl acetamide and dimethyl sulfoxide.

4. A process for preparing a spinning solution for the preparation of elastic polyurethane fibers which comprises heating in an inert solvent, said inert solvent being non-reactive with —NCO groups, (1) an isocyanate modified organic compound prepared by reacting (a) an organic compound containing active hydrogen containing groups as determined by the Zerewitinoff method and having a molecular weight of from about 500 to about 3000 with (b) an excess of an organic polyisocyanate sufficient to provide free —NCO groups in said isocyanate modified organic compound, with (2) a member selected from the group consisting of polyhydric alcohols and polyamines, the quantity of which is insufficient to react with all of the isocyanate groups of said isocyanate modified organic compound, (3) an isocyanate polymerization catalyst and (4) a member selected from the group consisting of monovalent alcohols and amines and continuing the reaction until the solution is free of —NCO groups while adding to the viscous solution a solvent selected from the group consisting of dimethyl formamide, dimethyl acetamide and dimethyl sulfoxide.

5. A process for preparing a spinning solution for the preparation of elastic polyurethane fibers which comprises heating in an inert solvent at a temperature of from about 70° C. to about 130° C., said inert solvent being non-reactive with —NCO groups, (1) an isocyanate modified organic compound prepared by reacting (a) an organic compound containing active hydrogen containing groups as determined by the Zerewitinoff method and having a molecular weight of from about 500 to about 3000 with (b) an excess of an organic polyisocyanate sufficient to provide free —NCO groups in said isocyanate modified organic compound, with (2) a member selected from the group consisting of polyhydric alcohols and polyamines the quantity of which is insufficient to react with all of the isocyanate groups of said isocyanate modified organic compound and (3) an isocyanate polymerization catalyst, continuing the reaction at said temperature until the solution is free of —NCO groups and while adding to the viscous solution a solvent selected from the group consisting of dimethyl formamide, dimethyl acetamide and dimethyl sulfoxide to produce a stable spinning solution having a solid content of from about 20 to about 50%.

6. A process for preparing a spinning solution for the preparation of elastic polyurethane fibers which comprises heating in an inert solvent, said inert solvent being non-reactive with —NCO groups, (1) an isocyanate modified organic compound prepared by reacting (a) an organic compound containing active hydrogen containing groups as determined by the Zerewitinoff method and having a molecular weight of from about 500 to about 3000 and selected from the group consisting of hydroxyl polyesters prepared by reacting polyhydric alcohols with polycarboxylic acids, polyhydric polyalkylene ethers, polyhydric polyalkylene thioethers and polyacetals, with (b) an excess of an organic polyisocyanate sufficient to provide free —NCO groups in said isocyanate modified organic compound with (2) a member selected from the group consisting of polyhydric alcohols and polyamines, the quantity of which is insufficient to react with all of the isocyanate groups while adding to the viscous solution a solvent selected from the group consisting of dimethyl formamide, dimethyl acetamide and dimethyl sulfoxide and (3) an isocyanate polymerization catalyst and continuing the reaction until the solution is free of —NCO groups.

7. The process of claim 6 wherein the organic polyisocyanate is 4,4'-diphenylmethane diisocyanate.

8. The process of claim 6 wherein the organic diisocyanate is tolylene diisocyanate.

9. The process of claim 6 wherein the organic compound containing active hydrogen containing groups is an hydroxyl polyester.

10. The process of claim 6 wherein the organic compound containing active hydrogen containing groups is polyhydric polyalkylene ether.

11. A completely reacted spinning solution for preparing polyurethane fibers prepared by the process which comprises heating in an inert solvent, said inert solvent being non-reactive with —NCO groups, (1) an isocyanate modified organic compound prepared by reacting (a) an organic compound containing active hydrogen containing groups a determined by the Zerewitinoff method and having a molecular weight of from about 500 to about 3000 and selected from the group consisting of hydroxyl polyesters prepared by reacting polyhydric alcohols with polycarboxylic acids, polyhydric polyalkylene ethers, polyhydric polyalkylene thioethers and polyacetals, with (b) an excess of an organic polyisocyanate sufficient to provide free —NCO groups in said isocyanate modified organic compound, with (2) a member selected from the group consisting of polyhydric alcohols and polyamines, the quantity of which is insufficient to react with all of the isocyanate groups of said isocyanate modified organic compound and (3) an isocyanate polymerization catalyst and continuing the reaction until the solution is free of —NCO groups while adding to the viscous solution a solvent selected from the group consisting of dimethyl formamide, dimethyl acetamide and dimethyl sulfoxide.

12. A process for preparing a spinning solution for the preparation of elastic polyurethane fibers which comprises heating in an inert solvent, said inert solvent being non-reactive with —NCO groups, (1) an isocyanate modified organic compound prepared by reacting (a) an organic compound containing active hydrogen containing groups as determined by the Zerewitinoff method and having a molecular weight of from about 500 to about 3000 and selected from the group consisting of hydroxyl polyesters prepared by reacting polyhydric alcohols with polycarboxylic acids, polyhydric polyalkylene ethers, polyhydric polyalkylene thioethers and polyacetals with (b) an excess of an organic polyisocyanate sufficient to provide free —NCO groups in said isocyanate modified organic compound with (2) a member selected from the group consisting of polyhydric alcohols and polyamines, the quantity of which is insufficient to react with all of the isocyanate groups of said isocyanate modified organic compound and (3) an isocyanate polymerization catalyst, continuing the reaction until the solution is free of —NCO groups while adding to the viscous solution a solvent selected from the group consisting of dimethyl formamide, dimethyl acetamide and dimethyl sulfoxide to produce a stable spinning solution having a solid content of from about 20 to about 50%.

References Cited by the Examiner

UNITED STATES PATENTS

| | | | |
|---|---|---|---|
| 2,650,212 | 8/53 | Windemuth | 260—75 |
| 2,755,266 | 7/56 | Brenschede. | |
| 2,929,800 | 3/60 | Hill | 260—30.4 |
| 2,929,803 | 3/60 | Frazer et al. | 260—77.5 |
| 2,929,804 | 3/60 | Steuber | 260—77.5 |
| 2,978,449 | 4/61 | France et al. | 260—2.5 |
| 2,993,870 | 7/61 | Burkus | 260—2.5 |
| 3,036,042 | 5/62 | Schmidt et al. | 260—77.5 |
| 3,097,192 | 7/63 | Schilit | 260—30.8 |

ALEXANDER H. BRODMERKEL, *Primary Examiner.*

MICHAEL V. BRINDISI, WILLIAM H. SHORT,
*Examiners.*